(12) United States Patent
Winger

(10) Patent No.: US 7,567,259 B2
(45) Date of Patent: Jul. 28, 2009

(54) SYSTEM AND METHOD FOR DISPLAY COMPOSITING

(75) Inventor: Lowell L. Winger, Waterloo (CA)

(73) Assignee: LSI Corporation, Milpitas, CA (US)

( * ) Notice: Subject to any disclaimer, the term of this patent is extended or adjusted under 35 U.S.C. 154(b) by 564 days.

(21) Appl. No.: 11/389,974

(22) Filed: Mar. 27, 2006

(65) Prior Publication Data

US 2007/0222790 A1 Sep. 27, 2007

(51) Int. Cl.
*G09G 5/00* (2006.01)

(52) U.S. Cl. .................. 345/629; 345/422; 345/428; 345/501; 345/545; 345/581; 345/589; 345/592; 345/597; 345/598; 345/599; 345/600; 345/601; 345/604

(58) Field of Classification Search .......... 345/422, 345/428, 629, 501, 545, 581, 589, 592, 600, 345/601, 604, 597, 598, 599
See application file for complete search history.

(56) References Cited

U.S. PATENT DOCUMENTS 5,892,521 A * 4/1999 Blossom et al. ............. 345/501
7,292,256 B2 * 11/2007 Lawther et al. ............. 345/629

* cited by examiner

*Primary Examiner*—Kimbinh T Nguyen
(74) *Attorney, Agent, or Firm*—Christopher P. Maiorana, PC

(57) ABSTRACT

A method for display compositing is disclosed. The method generally includes the steps of (A) generating a plurality of respective color values and a plurality of respective blending values for a plurality of graphics pixels to be blended with a display picture, (B) examining in a sequence a plurality of neighboring pixels of the graphics pixels adjoining a current pixel of the graphics pixels, the current pixel having a current color value of the respective color values and a current blending value of the respective blending values and (C) replacing the current color value with the respective color value for a particular pixel of the neighboring pixels where (i) the respective blending value for the particular pixel comprises one of a plurality of non-transparent values and (ii) the current blending value comprises one of at least one transparent value.

20 Claims, 7 Drawing Sheets

BEFORE SCALING

| PIXEL LUMA (Y) VALUE | ALPHA VALUE | |
|---|---|---|
| 0 (BLACK) | 0 (TRANSPARENT) | |
| 0 | 0 | |
| 0 | 255 (OPAQUE) | ⎫ BLACK COATING ON TOP OF SUBPICTURE |
| 0 | 255 | ⎭ |
| 255 (WHITE) | 255 | ⎫ WHITE TEXT ON BLACK COATING |
| 255 | 255 | |
| 255 | 255 | ⎭ |
| 0 | 255 | ⎫ BLACK COATING |
| 0 | 0 | ⎭ |

AFTER SCALING
2 TAP {1/2, 1/2} FILTER

| PIXEL LUMA (Y) VALUE | ALPHA VALUE | |
|---|---|---|
| 0 | 0 | |
| 0 | 0 | |
| 0 | 128 | |
| 0 | 255 | |
| 0 | 255 | |
| 0 | 255 | |
| 128 | 255 | } GREY |
| 255 | 255 | |
| 255 | 255 | |
| 255 | 255 | |
| 255 | 255 | |
| 128 | 255 | } GREY |
| 0 | 255 | |
| 0 | 128 | |
| 0 | 0 | |

FIG. 1

SYSTEM AND METHOD FOR DISPLAY COMPOSITING

FIELD OF THE INVENTION

The present invention relates to graphic overlays generally and, more particularly, to a system and method for display compositing.

BACKGROUND OF THE INVENTION

Graphical information (i.e., DVD subpictures and on-screen-displays (OSD)) is commonly encoded with a color lookup-table (CLUT) approach. The CLUT approach translates an index value into three color components and an alpha (i.e., blending) component for display compositing for each graphics pixel. The color components are typically represented as either (i) a luminance value (Y) and two chrominance values (U, V) or (ii) a red value (R), a green value (G) and a blue value (B) per pixel.

Problems can arise where the number of CLUT table entries with a transparent alpha value (i.e., $\alpha=0$) is limited. Having limited color components associated with the transparent alpha values is fine if the graphics are displayed at an original resolution. However, if the graphics are to be upscaled or downscaled prior to display (either horizontally or vertically or both), a polyphase filter interpolation or other multitap, typically lowpass, filtering is commonly implemented to individually scale the four component planes of the graphics. The filtering is performed to reduce aliasing and to make the graphics appear smoothly composited with the underlying display pictures.

Filtering on the limited number of CLUT entries can be problematic because the graphics pixel values are often non-contiguous in the graphics plane for the transparent alpha values. An example is a CLUT having a limited number of colors (i.e., one color) associated with all of the transparent alpha value entries. After scaling the graphic pixels, a new alpha plane will have newly interpolated graphic pixels between the original graphic pixels or modified versions of the original graphic pixels. The interpolated/modified graphic pixels have (i) alpha values that are a weighted average of the alpha values of the contributing neighboring pixels and (ii) color values that are also weighted averages of the contributing neighboring pixels. As such, the new graphic pixels adjacent transparent regions of the graphics picture have non-zero alpha values and color values that are averages between intended colors and unnatural (i.e., default) colors of the transparent graphics pixels.

Referring to FIG. 1, an example column of graphics pixels is shown where the transparent alpha value is restricted to a black color value (i.e., (0,0,0)=(R,G,B) or (0,0,0)=(Y,U,V)). If transparent graphics pixels surround white text graphic pixels, the scaled text has gray values for the graphic pixels alpha-blended/composited with a video picture. The resulting "gray lines" surrounding the white text of the graphics appear very unnatural and poor. The grey lines appear on top of the black coating and are obviously "wrong" and visibly disturbing.

SUMMARY OF THE INVENTION

The present invention concerns a method for display compositing. The method generally comprises the steps of (A) generating a plurality of respective color values and a plurality of respective blending values for a plurality of graphics pixels to be blended with a display picture, (B) examining in a sequence a plurality of neighboring pixels of the graphics pixels adjoining a current pixel of the graphics pixels, the current pixel having a current color value of the respective color values and a current blending value of the respective blending values and (C) replacing the current color value with the respective color value for a particular pixel of the neighboring pixels where (i) the respective blending value for the particular pixel comprises one of a plurality of non-transparent values and (ii) the current blending value comprises one of at least one transparent value.

The objects, features and advantages of the present invention include providing a system and method for display compositing that may (i) reduce artifacts around scaled graphics, (ii) provide efficient bandwidth and storage implementations, (iii) establish rules for when to enable transparent color replacement operations and/or (v) provide a robust and simple method of operation.

BRIEF DESCRIPTION OF THE DRAWINGS

These and other objects, features and advantages of the present invention will be apparent from the following detailed description and the appended claims and drawings in which:

FIG. 1 is an example column of graphics pixels where the transparent alpha value is restricted to a black color value;

DETAILED DESCRIPTION OF THE PREFERRED EMBODIMENTS

Figure 2:
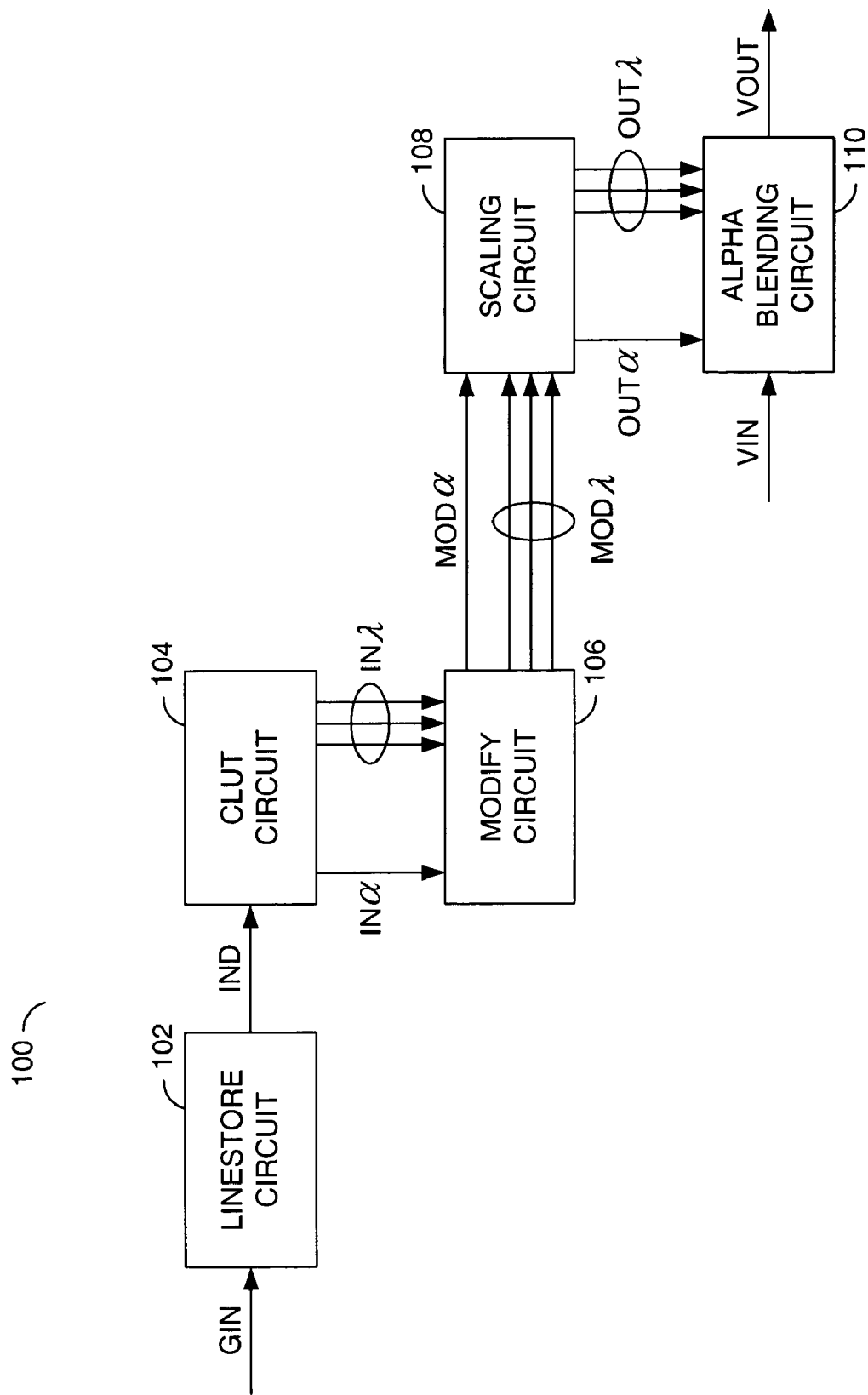
FIG. 2 is a block diagram of an example implementation of a system in accordance with a preferred embodiment of the present invention.

Referring to FIG. 2, a block diagram of an example implementation of a system 100 is shown in accordance with a preferred embodiment of the present invention. The system (or apparatus) 100 may be referred to as a display compositing system. The display compositing system 100 may be operational to blend a graphics picture with video pictures. The display compositing system 100 generally provides one or more approaches to graphics blending that may be superior to existing solutions for scaling of graphics with a transparent alpha and limited color lookup table (CLUT) operations. Limited CLUT operations may define a situation where the colors/pixel values for a transparent portion of the graphics (i) may be one or more unnatural values (e.g., default values) due to the limitations of the CLUT or the graphics design and (ii) may not be similar to adjacent pixel colors/values.

The display compositing system 100 generally comprises a circuit (or module) 102, a circuit (or module) 104, a circuit (or module) 106, a circuit (or module) 108 and a circuit (or module) 110. An input signal (e.g., GIN) may be received by the circuit 102. The circuit 102 may generate and present a signal (e.g., IND) to the circuit 104. A signal (e.g., INα) and a signal (e.g., INλ) may be presented from the circuit 104 to the circuit 106. A signal (e.g., MODα) and a signal (e.g., MODλ) may be transferred from the circuit 106 to the circuit 108. The circuit 108 may generate and present a signal (e.g., OUTα) and a signal (e.g., OUTλ) to the circuit 110. A video input signal (e.g., VIN) may be received by the circuit 110. The circuit 110 may generate and present a video output signal (e.g., VOUT).

The circuit 102 may be referred to as a linestore (or memory) circuit. The linestore circuit 102 may be operational to buffer at least two display lines (or rows) of graphic information received in the signal GIN. The graphic information may be read from the linestore circuit 102 via the signal IND.

The signal GIN may be a graphics input signal conveying a graphics picture to be blended with one or more display pictures from the signal VIN. The graphics picture may be written into the linestore circuit 102 in a raster scan order. Each pixel of the graphics picture may be represented in the signal GIN in a compressed form (e.g., an 8-bit index value). In some embodiments, the raster scan order may be a progressive scan. In other embodiments, the raster scan order may be an interlaced scan.

The signal IND may convey the index values for the graphics picture pixels from the linestore circuit 102 to the circuit 104. The index values may be read from the linestore circuit 102 and transferred to the circuit 104 one at a time. Two or more index values may be conveyed by the signal IND for each current graphics pixel under consideration.

The circuit 104 may be referred to as a CLUT circuit. The CLUT circuit 104 may be operational to convert the index values received in the signal IND into multiple (e.g., four) components. A first component may be an alpha (or blending) component. The other three components may be three color components that represent a hue and a saturation (e.g., a color) of a specific graphics pixel in an uncompressed form. In some embodiments, the color components may be presented as a luminance value and two chrominance values (e.g., YUV). In other embodiments, the color components may be presented as a red value, a green value and a blue value (e.g., RGB). The three color components may collectively form a color (or visual) value.

The signal INα may carry the alpha value generated by the CLUT circuit 104 associated with the index value received by the CLUT circuit 104 in the signal IND. The signal INλ may carry the color value generated by the CLUT circuit 104 associated with the index value received by the CLUT circuit 104 in the signal IND. The signal INλ generally comprises three portions, a portion for each of the three color components.

The circuit 106 may be referred to as a modify circuit. The modify circuit 106 may be operational to (i) determine when to modify a current color value of a current graphics pixel and (ii) how to modify the current color value based on the neighboring graphics pixels. One or more methods (or processes) for determining how to modify and/or replace the current color value may be implemented in the modify circuit 106, as discussed in detail below. Buffers within the modify circuit 106 may be implemented to store alpha values and color values of neighboring graphics pixels to feed the replacement methods.

The signal MODα may carry the alpha value of the current graphics pixel from the modify circuit 106 to the circuit 108. The signal MODλ may carry the color value of the current graphics pixel to the circuit 108. The signal MODλ generally comprises three portions (e.g., YUV or RGB), a portion for each of the color components.

The circuit 108 may be referred to as a scaling circuit. The scaling circuit 108 may be operational to scale (e.g., upscale or downscale) a graphics picture formed by the graphics pixels to another (e.g., higher or lower) resolution. The scaling may be performed independently on each of the component planes (e.g., YUVα or RGBα). In some embodiments, the higher resolution may be a high definition resolution (e.g., 1920×1080 interlaced or 1280×720 progressive). In some embodiments, the lower resolution may be a Common Intermediate Format (e.g., 352×240) or a fraction thereof. Scaling may be implemented by a multi-tap interpolation filter (e.g., a two-tap {½,½} filter) and/or a decimation filter. Other scaling designs may be implemented to meet the criteria of a particular application. The original graphics pixels, original alpha values, the interpolated graphics pixels, the interpolated alpha values, the modified graphics pixels and the modified alpha values may be presented to the circuit 110 via the signals OUTα and OUTλ.

The signal OUTα may carry the alpha value of the scaled graphics pixels from the scaling circuit 108 to the circuit 110. The signal OUTλ may carry the color value of the scaled graphics pixel to the circuit 110. The signal OUTλ generally comprises three portions (e.g., YUV or RGB), a portion for each of the color components.

The circuit 110 may be referred to as an alpha blending circuit. The alpha blending circuit 110 may be operational to blend (or composite) the scaled graphics picture received in the signal OUTλ with one or more video pictures received in the signal VIN. The blending is generally controlled on a pixel-by-pixel basis as determined by the alpha values received in the signal OUTλ. The blended pictures may be presented from the display compositing circuit 100 via the signal VOUT.

The signal VIN generally carries a sequence of video display pictures, or a still display picture, to the alpha blending circuit 110. Each of the display pictures may comprise a standard or non-standard formatted picture. The signal VOUT generally carries the sequence of video display pictures, or the still display picture, with the graphics picture blended therein.

Figure 3:
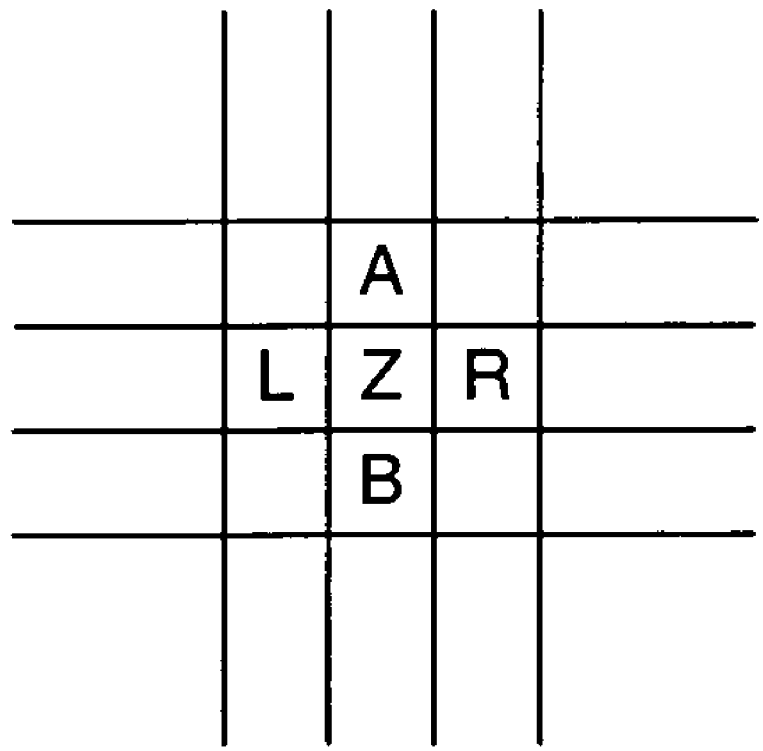
FIG. 3 is a diagram of a portion of an example graphics picture.

Referring to FIG. 3, a diagram of a portion of an example graphics picture 120 is shown. The graphics picture 120 generally comprises a two-dimensional array of graphics pixel elements. Each of the graphics pixel elements generally comprises an alpha value and a color value. Several neighboring graphics pixels (e.g., A, B, L and R) are generally illustrated vertically-and-horizontally adjoining a current graphics pixel (e.g., Z).

The current graphics pixel Z may represent a current graphics pixel having a current alpha value (e.g., Zα) and a current color value (e.g., Zλ). If the current graphics pixel Z is a transparent pixel, the initial color value Zλ generated by the CLUT circuit 104 may be a predetermined value (e.g., Zλ= (0,0,0) or black) and the alpha value Zα may have a predetermined transparent value (e.g., Zα=zero or Δ). In some embodiments, multiple transparent values may be defined and multiple associated default color values may be defined in the CLUT operation. If the current graphics pixel Z is a non-transparent pixel, the color value Zλ may be any among multiple color values and the alpha value Zα may be a predetermined non-transparent value (e.g., Zα=255 or non-zero or 255). In some embodiments, multiple non-transparent alpha values may be defined in the CLUT operation.

A first graphics pixel spatially above the current graphics pixel Z may be labeled as "A". A second graphics pixel spatially below the current graphics pixel Z may be labeled as "B". A third graphics pixel spatially to the left of the current graphics pixel Z may be labeled as "L". A fourth graphics pixel spatially to the right of the current graphics pixel Z may be labeled as "R".

Figure 4:
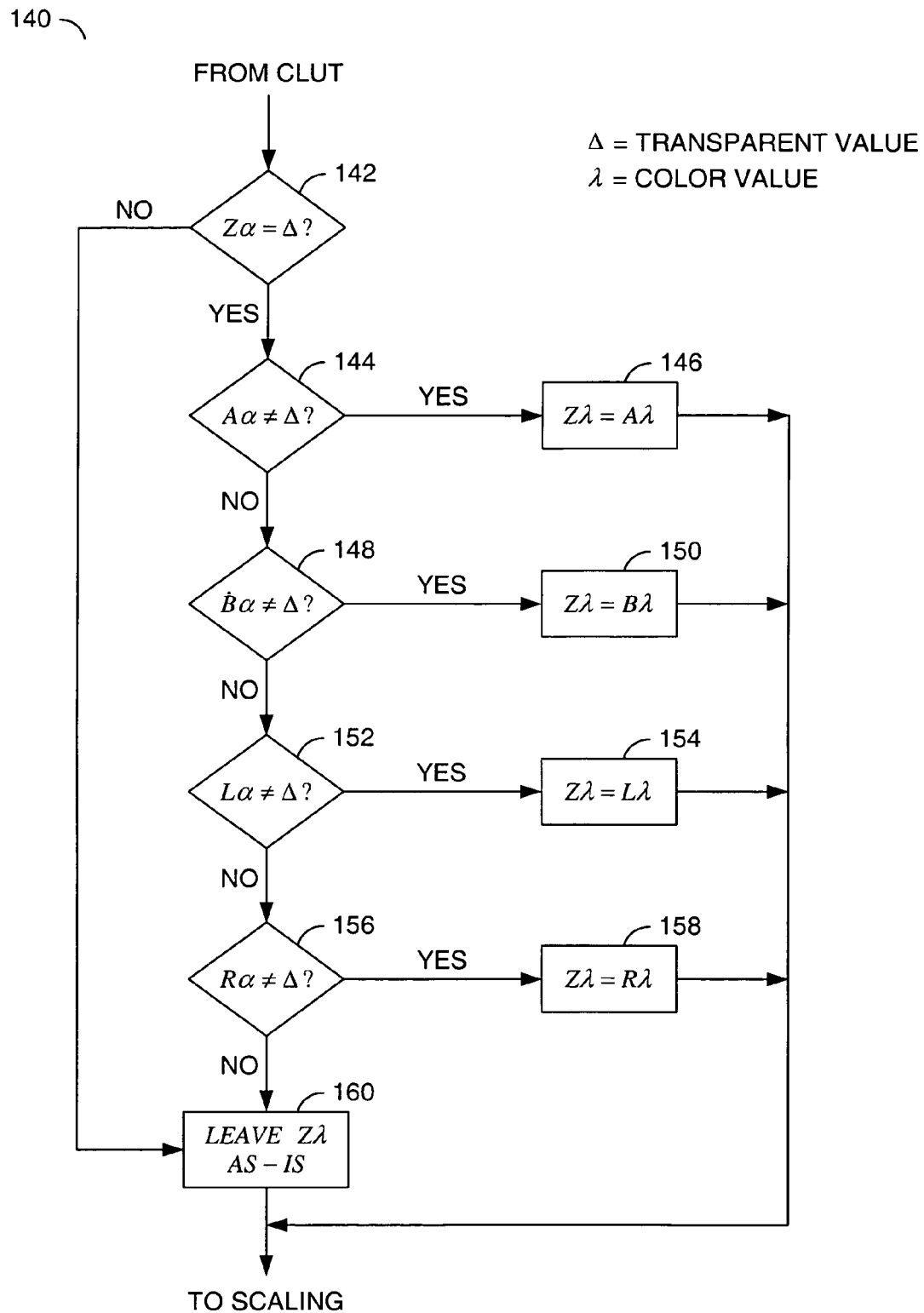
FIG. 4 is a flow diagram of a first example method for modifying a current color value of a current graphics pixel.

Referring to FIG. 4, a flow diagram of a first example method 140 for modifying the current color value of the current graphics pixel is shown. The first method (or process) 140 generally seeks transparent alpha values for each current graphics pixel in sequence. For each current graphics pixel with a transparent alpha value, the associated pixel value (other than the alpha value) may be replaced with the pixel value from an adjacent graphics pixel with a non-transparent (e.g., non-zero) alpha value. The first method 140 may be used when the graphics pixels are suspected of having unnatural pixel values for the transparent pixels. The graphics may be suspect when the CLUT circuit 104 has fewer (e.g., only one) entries for the transparent graphics pixels than entries for the non-transparent graphics pixels.

The first method 140 generally comprises a step (or block) 142, a step (or block) 144, a step (or block) 146, a step (or block) 148, a step (or block) 150, a step (or block) 152, a step (or block) 154, a step (or block) 156, a step (or block) 158 and a step (or block) 160. The first method 140 may be implemented in the modify circuit 106. The implementation may be hardware-only or a mixture of dedicated hardware and software executing on a processor.

In the step 142, the alpha value $Z\alpha$ of the current graphics pixel Z is examined. If the alpha value $Z\alpha$ is one of the transparent values (e.g., the YES branch of step 142), the alpha value $A\alpha$ of the graphics pixel A immediately above the current graphics pixel Z may be checked in the step 144. If the alpha value $A\alpha$ is a non-transparent value (e.g., the YES branch of step 144), the modify circuit 106 may replace the current graphics pixel color value $Z\lambda$ with the above graphics pixel color value $A\lambda$ in the step 146.

If the alpha value $A\alpha$ is one of the transparent values (e.g., the NO branch of step 144), the alpha value $B\alpha$ of the graphics pixel B immediately below the current graphics pixel Z may be checked in the step 148. If the alpha value $B\alpha$ is a non-transparent value (e.g., the YES branch of step 148), the modify circuit 106 may replace the current graphics pixel color value $Z\lambda$ with the below graphics pixel color value $B\lambda$ in the step 150.

If the alpha value $B\alpha$ is one of the transparent values (e.g., the NO branch of step 148), the alpha value $L\alpha$ of the graphics pixel L immediately to the left the current graphics pixel Z may be checked in the step 152. If the alpha value $L\alpha$ is a non-transparent value (e.g., the YES branch of step 152), the modify circuit 106 may replace the current graphics pixel color value $Z\lambda$ with the left graphics pixel color value $L\lambda$ in the step 154.

If the alpha value $L\alpha$ is one of the transparent values (e.g., the NO branch of step 152), the alpha value $R\alpha$ of the graphics pixel R immediately to the right of the current graphics pixel Z may be checked in the step 156. If the alpha value $R\alpha$ is a non-transparent value (e.g., the YES branch of step 156), the modify circuit 106 may replace the current graphics pixel color value $Z\lambda$ with the below graphics pixel color value $R\lambda$ in the step 158.

If the alpha value $R\alpha$ is one of the transparent values (e.g., the NO branch of step 156) or the alpha value $Z\alpha$ is one of the non-transparent values (e.g., the NO branch of step 142), the color value $Z\lambda$ of the current graphics pixel may remain unchanged (e.g., represented by the step 160). The current graphics pixel value (e.g., alpha value $Z\alpha$ and color value $Z\lambda$) may then be presented to the scaling circuit 108 in the signals OUT$\alpha$ and OUT$\lambda$.

In some embodiments, additional adjacent graphics pixels (e.g., diagonally adjoining graphics pixels) may also be used in determining if the current color value $Z\lambda$ should be changed or not. However, checking the horizontally-and-vertically adjoining graphics pixels A, B, L and R generally reduces a majority of and/or the worst of the visual errors. The visual errors generally occur when a non-transparent adjacent graphics pixel is blended/filtered (e.g., by scaling) with a transparent graphics pixel that has an unnatural pixel value.

The most annoying artifacts may be in the form of vertically adjacent errors (e.g., entire display lines that are the "wrong" color after scaling). Therefore, the first method 140 generally checks the above and the below graphics pixels A and B first for color values to replace the current color value $Z\lambda$. The left and right adjoining graphics pixels L and R may be checked next, as fallback possibilities.

Figure 5:
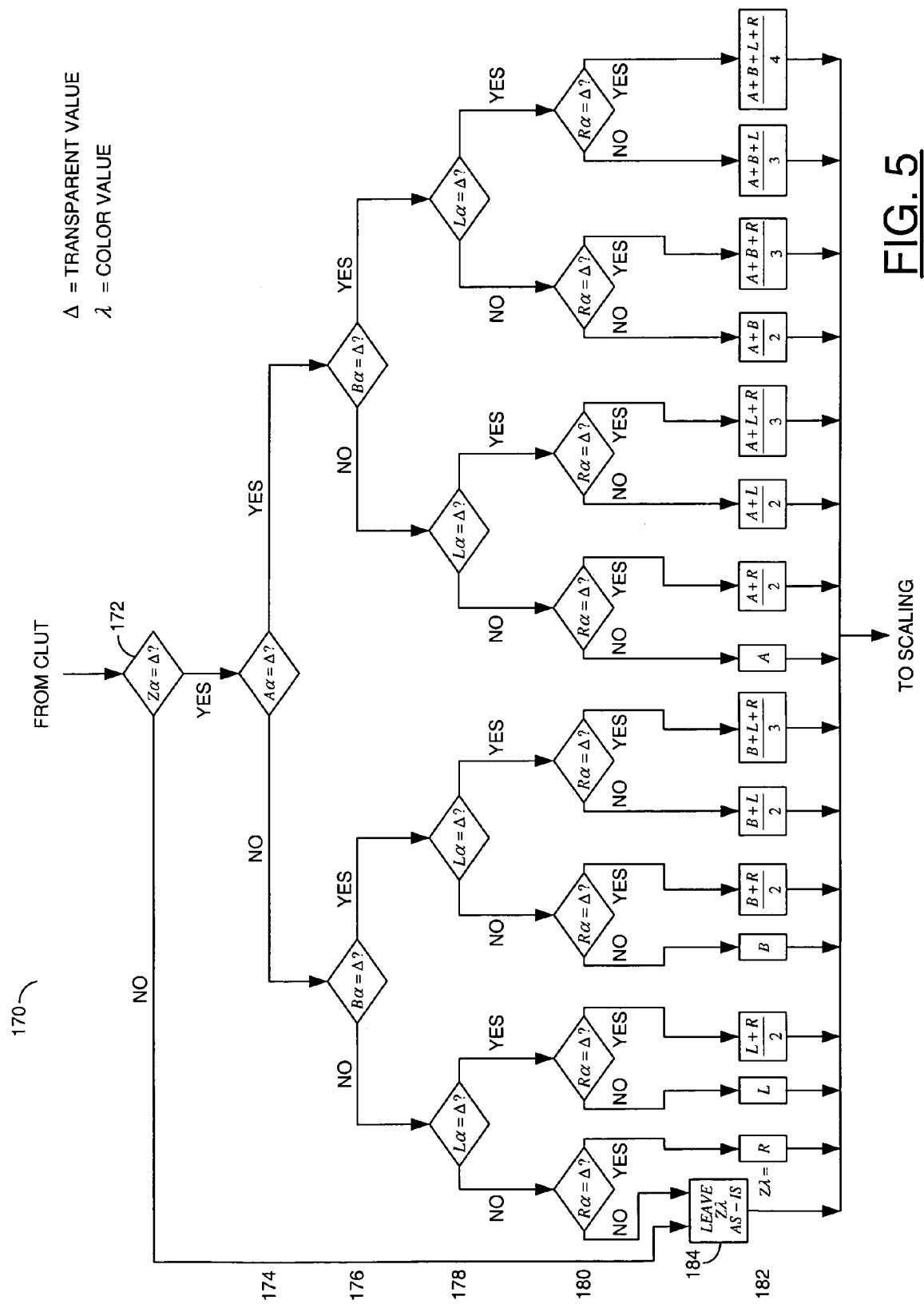
FIG. 5 is a flow diagram of a second example method for modifying the current color value of the current graphics pixel.

Referring to FIG. 5, a flow diagram of a second example method 170 for modifying the current color value of the current graphics pixel is shown. The second method (or process) 170 generally replaces the current pixel value $Z\lambda$ with an average/mean color values of the four adjoining graphics pixels A, B, L and R that are not transparent. The second method 170 generally forms a decision tree comprising a step (or block) 172, a layer (or level) 174, a layer (or level) 176, a layer (or level) 178, a layer (or level), a layer (or level) 182 and a step (or block) 184.

If the current alpha value $Z\alpha$ is one of the transparent values (e.g., the YES branch of step 172), the second method 170 generally checks the alpha value $A\alpha$ of the above graphics pixel A in the first decision layer 174. The alpha value $B\alpha$ of the below graphics pixel B is checked in the second decision layer 176. In the third decision layer 178, the alpha value $L\alpha$ of the left graphics pixel L is checked. Finally, the alpha value $R\alpha$ of the right graphics pixel R is checked in the fourth decision layer 180. Based on the alpha values $A\alpha$, $B\alpha$, $L\alpha$ and $R\alpha$, the current color value $Z\lambda$ is changed or left as-is (e.g., step 184) in the layer 182. If the current alpha value $Z\alpha$ is one of the non-transparent values (e.g., the NO branch of step 172), the second method 170 generally leaves the alpha value $Z\alpha$ unchanged (e.g., the step 184). The current graphics pixel value may then be presented from the modify circuit 106 to the scaling circuit 108.

Figure 6:
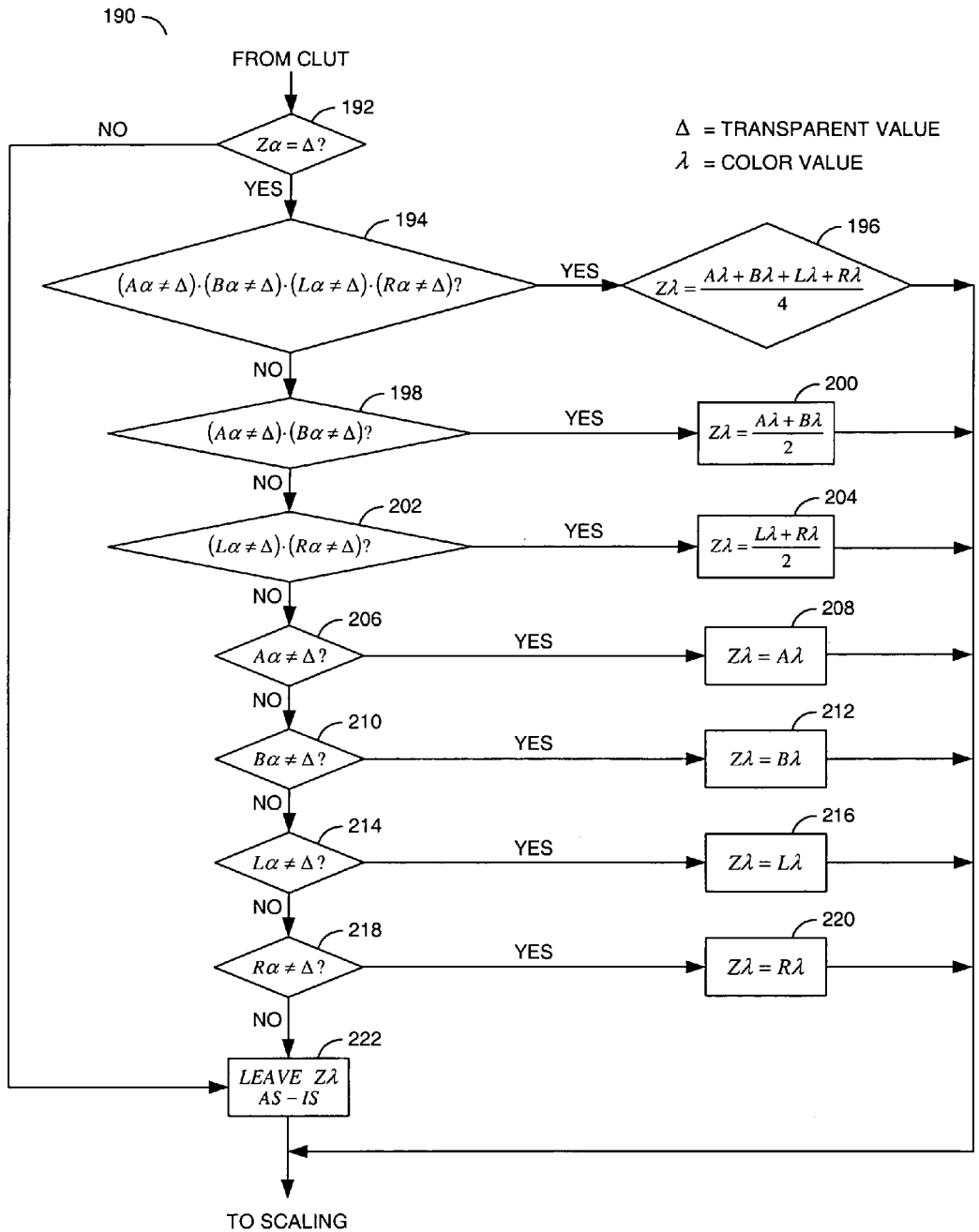
FIG. 6 is a flow diagram of a third example method for modifying the current color value of the current graphics pixel.

Referring to FIG. 6, a flow diagram of a third example method 190 for modifying the current color value of the current graphics pixel is shown. The third method (or process) 190 generally seeks transparent alpha values around each current graphics pixel is series of predetermined patterns. A first pattern may check all of the neighboring graphics pixels A, B, L and R. A second pattern may check the vertically adjoining graphics pixel A and B. A third pattern may check the horizontally adjoining graphics pixel L and R. Afterwards, each of the adjoining graphics pixels may be checked in an order of A, B, L and then R.

The third method 190 generally comprises a step (or block) 192, a step (or block) 194, a step (or block) 196, a step (or block) 198, a step (or block) 200, a step (or block) 202, a step (or block) 204, a step (or block) 206, a step (or block) 208, a step (or block) 210, a step (or block) 212, a step (or block) 214, a step (or block) 216, a step (or block) 218, a step (or block) 220 and a step (or block) 222.

In the step 192, the modify circuit 106 may check the current alpha value $Z\alpha$. If the current alpha value $Z\alpha$ has one of the transparent values (e.g., the YES branch of step 192), the four alpha values $A\alpha$, $B\alpha$, $L\alpha$ and $R\alpha$ may be checked in the step 194. If each of the four alpha values $A\alpha$, $B\alpha$, $L\alpha$ and $R\alpha$ have one of the non-transparent values (e.g., the YES branch of step 194), the current color value $Z\lambda$ may be calculated as an average of the four color values $A\lambda$, $B\lambda$, $L\lambda$ and $R\lambda$ in the step 196. If any one or more of the alpha values $A\alpha$, Bα, Lα and Rα have one of the transparent values (e.g., the NO branch of step 194), the alpha values Aα and Bα may be checked in the step 198.

If both of the alpha values Aα and Bα have one of the non-transparent values (e.g., the YES branch of step 198), the current color value Zλ may be calculated as an average of the two color values Aλ and Bλ in the step 200. If any one or both of the alpha values Aα and Bα have one of the transparent values (e.g., the NO branch of step 198), the alpha values Lα and Rα may be checked in the step 202.

If both of the alpha values Lα and Rα have one of the non-transparent values (e.g., the YES branch of step 202), the current color value Zλ may be calculated as an average of the two color values Lλ and Rλ in the step 204. If any one or both of the alpha values Lα and Rα have one of the transparent values (e.g., the NO branch of step 202), just the alpha value Aα may be checked in the step 206.

If the alpha value Aα has one of the non-transparent values (e.g., the YES branch of step 206), the current color value Zλ may be replaced by the color value Aλ in the step 208. If the alpha values Aα has one of the transparent values (e.g., the NO branch of step 206), just the alpha value Bα may be checked in the step 210.

If the alpha value Bα has one of the non-transparent values (e.g., the YES branch of step 210), the current color value Zλ may be replaced by the color value Bλ in the step 212. If the alpha values Bα has one of the transparent values (e.g., the NO branch of step 210), just the alpha value Lα may be checked in the step 214.

If the alpha value Lα has one of the non-transparent values (e.g., the YES branch of step 214), the current color value Zλ may be replaced by the color value Lλ in the step 216. If the alpha values Lα has one of the transparent values (e.g., the NO branch of step 214), just the alpha value Rα may be checked in the step 218.

If the alpha value Rα has one of the non-transparent values (e.g., the YES branch of step 218), the current color value Zλ may be replaced by the color value Rλ in the step 220. If the alpha values Rα has one of the transparent values (e.g., the NO branch of step 218), the current color value Zλ may remain unchanged (e.g., as represented by the step 222). Furthermore, if the current alpha value Zα has one of the non-transparent values (e.g., the NO branch of step 192), the current color value Zλ may remain unchanged at the step 222. The current pixel value Z may then be presented to the scaling circuit 108.

Many potential variations on the above methods 140, 170 and 190 generally exist. However, all variation may involve deriving the current graphics pixel values from the graphics pixel values of the non-transparent neighbors. Furthermore, the method 140, 170 and/or 190 may be implemented in a Finite Impulse Response (FIR) fashion (e.g., not-in-place inputs) or an Infinite Impulse Response (IIR) fashion (e.g., in-place inputs). If the replacement methods 140, 170 and/or 190 are implemented as a FIR/not-in-place design, the original graphics plane is generally transformed into a new graphics plane where all the new graphics pixel values are derived directly from the neighbors in the original graphics plane. If the replacement methods 140, 170 and/or 190 are implemented as an IIR/in-place design, the graphics pixel values may be processed serially (e.g., in raster order). Thereafter, previously processed graphics pixels may be used as inputs to the replacement method for each succeeding pixel that is processed.

The above solutions may be implemented in either hardware and/or software. In some embodiments, a hardware solution may transfer the graphics plane index information in the signal GIN within the display compositing system 100 in a compressed form (e.g., CLUT input form) to save bandwidth. The compositing system 100 hardware may decode the CLUT graphics information to either an RGBα form or a YUVα form and then blend/alpha-composite the graphics with other video pictures in the signal VIN before presenting the signal VOUT. In such a case, an efficient hardware implementation may locally store all adjacent graphics index values (e.g., in two linestores of index values) used to generate the processed graphics video plane via the above described methods 140, 170 and/or 190. The FIR/not-in-place approach generally buffers only two linestores of compressed graphics data (e.g., 8-bits per pixel) in the linestore circuit 102. The IIR/in-place approach may implement linestores containing processed graphics values (e.g., 32-bits per pixel) representing the four components (e.g., YUVα or RGBα data). In terms of hardware area, processing the graphics data using the FIR/not-in-place approach may therefore be more efficient than the IIR/in-place approach.

Figure 7:
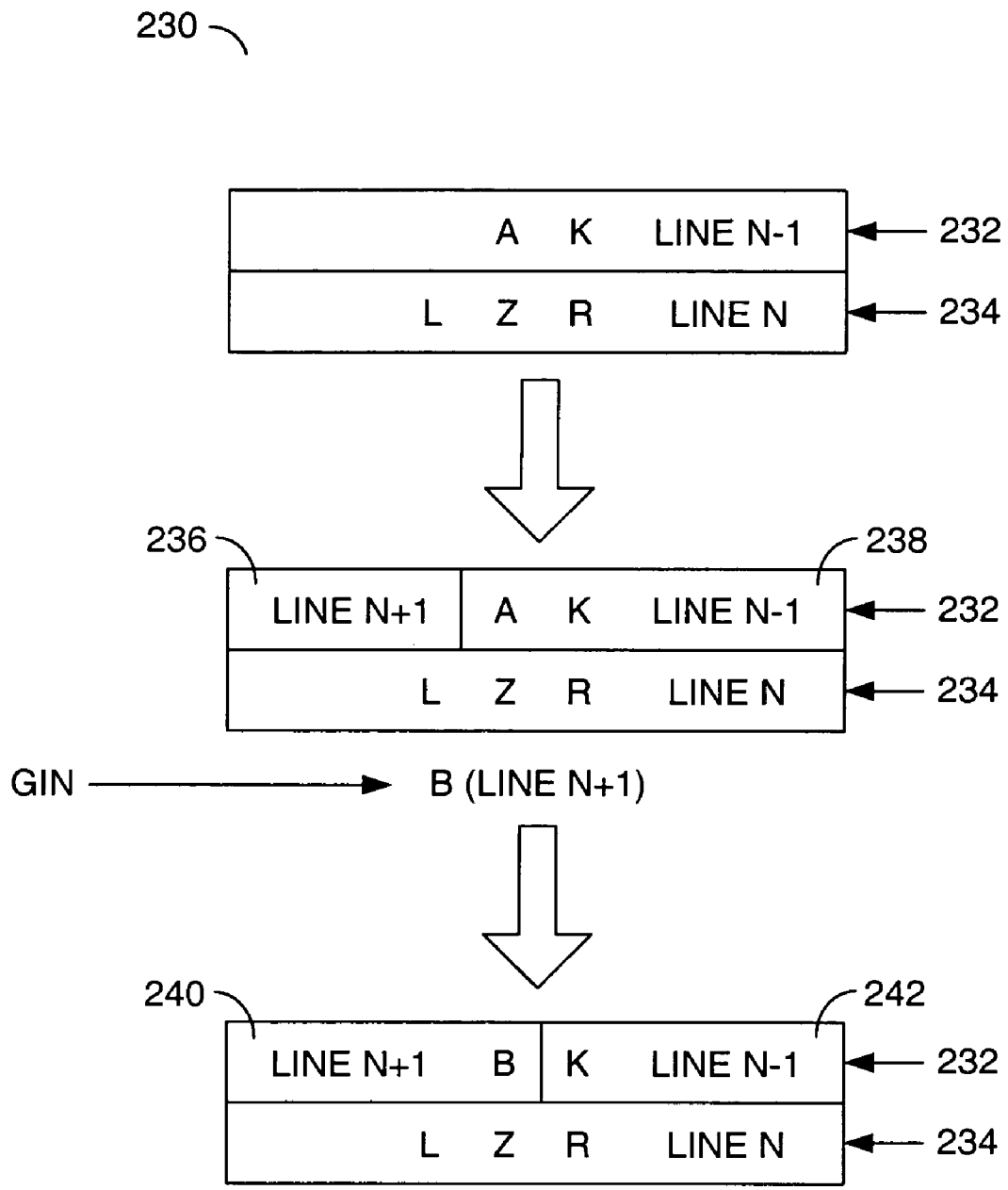
FIG. 7 is a diagram of an example not-in-place buffering method.

Referring to FIG. 7, a diagram of an example not-in-place buffering method 230 is shown. The linestore circuit 102 may be configured to hold two horizontal lines (or rows) of graphics indices for a graphics picture. A first linestore 232 may initially store the graphics index values for a previous line N−1. A second linestore 234 may buffer the graphics index values for a current line N.

As the graphics pixels of the current line N are processed, new graphics index values for a next line N+1 may be buffered in a new portion 236 of the first linestore 232, overwriting the previous graphics index values. The non-overwritten graphics index values from the previous line N−1 may remain in the first linestore 232 in an old portion 238.

When processing the current graphics pixel Z in the current linestore 134, the graphics index values for (i) the above graphics pixel A may read from the first linestore 232, the left graphics pixel L, the current graphics pixel Z and the right graphics pixel R may be read from the second linestore 234 and (iii) the below graphics pixel B may be received in the signal GIN (e.g., possibly buffered in a register). After processing the current graphics pixel Z, the graphics index value for the below graphics pixel B may be stored in an expanded new portion 240 of the first linesore 232 overwriting the graphics index value of the above graphics pixel A. As such, a reduced portion 242 of the first linestore 232 buffering previous line N−1 index values may remain.

Each of the graphics index values for the graphics pixels A, B, L, R and Z may be presented from the linestore circuit 102 to the CLUT circuit 104 via the signal IND, one at a time. The CLUT circuit 104 may, in turn, present, each converted group having an alpha value and a color value to the modify circuit 106, one converted group of values at a time. The modify circuit 106 may include buffers for temporarily holding the alpha values and the color values for up to nine graphics pixels (e.g., the current graphics pixel Z and the eight adjoining graphics pixels), depending on the replacement method being implemented. Several of the replacement methods may implement fewer buffers in the modify circuit 106. For example, the first method 140 may use only two buffers for the alpha values (e.g., Zα and only one of Aα, Bα, Lα or Rα at a time) and two sets of buffers (e.g., three 8-bit buffers per set) for the color values (e.g., the original Zλ and only one of Aλ, Bλ, Lλ or Rλ at a time).

The display compositing system 100 generally solves the quality problem with scaled graphics containing transparent CLUT values with an insufficient selection of color values associated with the transparent CLUT values. By replacing the default color values of a transparent graphics pixel with either the adjoining color values or some average of multiple adjoining color values, the newly created interpolated graphics pixels generally have reasonable color values. Receiving and buffering the graphics data in compressed form generally results in efficient hardware implementations in terms of bandwidth and storage criteria. The display compositing system 100 may implement a simple rule for picking when to activate and deactivate the transparent pixel color replacement methods (e.g., when the CLUT has fewer entries for transparent graphics pixels than for non-transparent graphics pixels).

The third method 190 may provide a robust and simple replacement method implementation. The third method 190 generally considers averages of adjacent graphics pixel values. Considering the averages should result in a more natural appearance of the interpolated graphics pixels compared with simple replacement in cases where the transparent area is only a single pixel wide and/or only a single pixel high. Furthermore, the third method 190 generally includes only three possibilities for averaging color values allowing for simple parallel custom/fast hardware implementations.

The function performed by the flow diagrams of FIGS. 4-6 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:

1. A method for display compositing, comprising the steps of:
   (A) generating sequentially in a lookup table circuit a plurality of respective color values and a plurality of respective blending values corresponding to a plurality of graphics pixels in a graphics plane to be blended with a display picture, said graphics plane comprising (i) a blending plane having said respective blending values and (ii) a plurality of color planes having said respective color values;
   (B) examining in a sequence a plurality of neighboring pixels of said graphics pixels spatially adjoining a current pixel of said graphics pixels using a modify circuit, said current pixel having a current color value of said respective color values and a current blending value of said respective blending values;
   (C) replacing said current color value with said respective color value of a particular pixel of said neighboring pixels where (i) said respective blending value of said particular pixel comprises one of a plurality of non-transparent values and (ii) said current blending value comprises one of at least one transparent value; and
   (D) maintaining said current color value where at least one of (i) all of said neighboring pixels comprise a respective one of said transparent values and (ii) said current blending value comprises one of said non-transparent values.

2. The method according to claim 1, wherein said sequence comprises:
   an above pixel of said neighboring pixels spatially above said current pixel.

3. The method according to claim 2, wherein after said above pixel, said sequence further comprises:
   a below pixel of said neighboring pixels spatially below said current pixel.

4. The method according to claim 3, wherein after said below pixel, said sequence further comprises:
   a left pixel of said neighboring pixels spatially left of said current pixel.

5. The method according to claim 4, wherein after said left pixel, said sequence further comprises:
   a right pixel of said neighboring pixels spatially right of said current pixel.

6. The method according to claim 1, further comprising the steps of:
   scaling a graphics picture formed by said graphics pixels in said graphics plane after said replacing; and
   blending said graphics picture with said display picture based on said respective blending values.

7. The method according to claim 1, wherein each of said color values comprises three components selected from a group having (i) a luminance component and two chrominance components and (ii) a red component, a green component and a blue component.

8. A method for display compositing, comprising the steps of:
   (A) generating sequentially in a lookup table circuit a plurality of respective color values and a plurality of respective blending values corresponding to a plurality of graphics pixels in a graphics plane to be blended with a display picture, said graphics plane comprising (i) a blending plane having said respective blending values and (ii) a plurality of color planes having said respective color values;
   (B) examining a plurality of neighboring pixels of said graphics pixels spatially adjoining a current pixel of said graphics pixels using a modify circuit, said current pixel having a current color value of said respective color values and a current blending value of said respective blending values;
   (C) calculating an average using from one to all of said respective color values of said neighboring pixels where (i) each of said respective blending values of said neighboring pixels contributing to said average has a respective one of a plurality of non-transparent values and (ii) said current blending value comprises one of at least one transparent value;
   (D) replacing said current color value with said average as calculated; and
   (E) maintaining said current color value where at least one of (i) all of said neighboring pixels comprise a respective one of said transparent values and (ii) said current blending value comprises one of said non-transparent values.

9. The method according to claim 8, wherein said neighboring pixels contributing to said average comprises (i) an upper pixel of said neighboring pixels spatially above said current pixel and (ii) a lower pixel of said neighboring pixels spatially below said current pixel.

10. The method according to claim 9, wherein said neighboring pixels contributing to said average further comprises (i) a left pixel of said neighboring pixels spatially left of said current pixel and (ii) a right pixel of said neighboring pixels spatially right of said current pixel.

11. The method according to claim 8, further comprising the step of:
   maintaining said current blending value through said replacing of said current color value.

12. The method according to claim 8, further comprising the step of:
   buffering in a memory a plurality of graphics index values corresponding to two raster lines of a graphics picture prior to said generating of said respective color values and said respective blending values.

13. The method according to claim 12, further comprising the step of:
   reading said graphics index values of at least two of said neighboring pixels and said current pixel from said memory to said lookup table circuit to accommodate said examining.

14. A method for display compositing, comprising the steps of:
   (A) generating sequentially in a lookup table circuit a plurality of respective color values and a plurality of respective blending values corresponding to a plurality of graphics pixels in a graphics plane to be blended with a display picture, said graphics plane comprising (i) a blending plane having said respective blending values and (ii) a plurality of color planes having said respective color values;
   (B) examining at most four neighboring pixels of said graphics pixels spatially adjoining a current pixel of said graphics pixels using a modify circuit, said current pixel having a current color value of said respective color values and a current blending value of said respective blending values;
   (C) calculating an average using one of (a) one color value, (b) two non-adjoining color values and (c) four color values of said respective color values of said four neighboring pixels where (i) each of said respective blending values of said four neighboring pixels contributing to said average has a respective one of a plurality of non-transparent values and (ii) said current blending value comprises one of at least one transparent value;
   (D) replacing said current color value with said average as calculated; and
   (E) maintaining said current color value where at least one of (i) all of said neighboring pixels comprise a respective one of said transparent values and (ii) said current blending value comprises one of said non-transparent values.

15. The method according to claim 14, further comprising the step of:
   replacing said current color value with an average of said respective color values for an upper pixel of said four neighboring pixels and a lower pixel of said four neighboring pixels where a respective blending value for at least one of (i) a left pixel of said four neighboring pixels and (ii) a right pixel of said four neighboring pixels has one of said at least one transparent values.

16. The method according to claim 15, further comprising the step of:
   replacing said current color value with an average of said respective color values for said left pixel and said right pixel where a respective blending value for at least one of (i) said upper pixel and (ii) said lower pixel has one of said at least one transparent values.

17. The method according to claim 14, further comprising the step of:
   replacing said current color value with one among said respective color values for said four neighboring pixels where each of said respective blending values for three of said four neighboring pixels comprise one of said at least one transparent value.

18. The method according to claim 14, further comprising the step of:
   buffering in a memory a plurality of graphics index values corresponding to two raster lines of a graphics picture prior to said generating of said respective color values and said respective blending values.

19. The method according to claim 18, further comprising the step of:
   reading said graphics index values of three of said four neighboring pixels and said current pixel from said memory to said lookup table circuit to accommodate said examining.

20. The method according to claim 19, wherein said buffering comprises the sub-step of:
   overwriting a previous line of said graphics index values with a next line of said graphics index values, one of said graphic index values at a time.

* * * * *